(12) United States Patent  
Ehara

(10) Patent No.: US 6,808,844 B2
(45) Date of Patent: Oct. 26, 2004

(54) BATTERY PACK

(75) Inventor: Yukio Ehara, Kyoto (JP)

(73) Assignee: GS-Melcotec Co., Ltd., Kyoto (JP)

( * ) Notice: Subject to any disclaimer, the term of this patent is extended or adjusted under 35 U.S.C. 154(b) by 240 days.

(21) Appl. No.: 10/106,048

(22) Filed: Mar. 27, 2002

(65) Prior Publication Data

US 2002/0142195 A1 Oct. 3, 2002

(30) Foreign Application Priority Data

Mar. 30, 2001 (JP) ........................................ 2001-098080
Jul. 10, 2001 (JP) ........................................ 2001-208763

(51) Int. Cl.$^7$ ............................ H01M 2/02; H01M 2/04
(52) U.S. Cl. ........................... 429/175; 429/7; 429/176; 429/178
(58) Field of Search ............................ 429/7, 175, 176, 429/178

(56) References Cited

U.S. PATENT DOCUMENTS

| 6,413,668 B1 | * | 7/2002 | Sandberg et al. | ............ 429/174 |
| 6,524,732 B1 | * | 2/2003 | Iwaizono et al. | ............... 429/7 |
| 2003/0108786 A1 | * | 6/2003 | Aaltonen et al. | ............ 429/61 |

FOREIGN PATENT DOCUMENTS

| JP | 2001-196048 | 7/2001 |
| JP | 2001-325927 | 11/2001 |

* cited by examiner

Primary Examiner—John S. Maples
(74) Attorney, Agent, or Firm—Wenderoth, Lind & Ponack, L.L.P.

(57) ABSTRACT

A battery pack adapted to be connected to an external circuit includes a battery case in which a power generating element is enclosed, the battery case having at least one side, a cover covering the side of the battery case so that a component disposing space is defined between the battery case and the cover, a circuit element disposed in the component disposing space and connected to the power generating element, and a terminal disposed in the component disposing space and connected both to the power generating element and via the cover to the external circuit.

2 Claims, 15 Drawing Sheets

BATTERY PACK

BACKGROUND OF THE INVENTION

1. Field of the Invention

This invention relates to a battery pack suitable for use with electronic equipment such as a portable telephone.

2. Description of the Related art

A battery pack comprising a secondary battery such as a lithium ion cell has conventionally been employed as a driving power source for electronic equipment such as a portable telephone. The battery pack comprises a secondary battery including an aluminum case and a power generating element enclosed in the aluminum case. Positive and negative terminals project from upper and lower sides of the secondary battery respectively. A nickel lead is connected to one of the terminals and extends along the aluminum case with an insulating tape interposed therebetween. The nickel lead extends to the side of the secondary battery from which the other terminal projects. The secondary battery is further enclosed in a plastic case together with a protection circuit board on which circuit elements are mounted.

Reductions in the size and weight of the battery pack have recently been demanded for the purpose of miniaturization and cost reduction of the electronic equipment such as a portable telephone. In the foregoing conventional structure, however, the secondary battery made by enclosing the power generating element in the aluminum case is further enclosed in the plastic case. Thus, a double enclosing structure employed for the secondary battery poses definite limits to the cost and weight reductions. Furthermore, the protection circuit board is enclosed with the secondary battery in the plastic case in the foregoing structure. The protection circuit board also poses limits to the cost and weight reductions.

SUMMARY OF THE INVENTION

Therefore, an object of the present invention is to provide a battery pack which can reduce the size and cost thereof.

The present invention provides a battery pack adapted to be connected to an external circuit, comprising a battery case in which a power generating element is enclosed, the battery case having at least one side, a cover covering the side of the battery case so that a component disposing space is defined between the battery case and the cover, a circuit element disposed in the component disposing space and connected to the power generating element, and a terminal disposed in the component disposing space and connected both to the power generating element and via the cover to the external circuit.

According to the foregoing battery pack, the terminal to be connected to the external circuit is disposed in the component disposing space defined by the cover. Accordingly, a nickel lead need not be caused to extend from one of two terminals to the side of the other terminal as described in the description of the related art. As a result, the sides of the battery pack need not be covered with the plastic case. Further, the circuit element required for connection to the external circuit is disposed in the component disposing space defined by the cover. Thus, since all the necessary electrical elements are located inside the cover, no plastic case covering the overall secondary battery is required.

In a preferred form, either one of the battery case and the cover has a locking protrusion located in the component disposing space, and the other has a locking receiver with which the locking protrusion is engaged so that the battery case and the cover are assembled together. In assembling the battery pack, the locking protrusion is engaged with the locking receiver. Consequently, the cover can easily be mounted to the battery case.

In a battery pack using no plastic case, a protection circuit etc. is considered to be fixed to a side of the secondary battery by low-pressure molding of a resin. In this case, however, the molten resin is brought into a direct contact with the secondary battery. As a result, there is a possibility that the secondary battery may be deteriorated since the secondary battery is heated. On the other hand, in the battery pack provided with the locking protrusion and the lock receiving portion, there is no possibility that heat is applied to the secondary battery during assembly of the battery pack. Consequently, deterioration of the secondary battery can be prevented.

The present invention also provides a battery pack adapted to be connected to an external circuit, comprising a battery case in which a power generating element is enclosed, the battery case having at least one side, and a circuit element mounted on the side of the battery case and having a plurality of terminals including at least one electrically connected to the power generating element. Since no protection circuit board is used in this structure, the size and cost of the battery pack can be reduced.

The circuit element preferably includes a functional portion and has a laminated structure in which the functional portion is interposed between a pair of the terminals, and the circuit element is preferably mounted on the side of the battery case so that a direction of lamination is generally perpendicular to the side of the battery case. In this construction, the terminal for connection to the external circuit does not confront the side of the battery case. Accordingly, since the terminal portion does not contact with the battery case, the terminal and the battery case can reliably be insulated from each other.

BRIEF DESCRIPTION OF THE DRAWINGS

Other objects, features and advantages of the present invention will become clear upon reviewing of the following detailed description of embodiments, made with reference to the accompanying drawings, in which.

DETAILED DESCRIPTION OF EMBODIMENTS

Figure 1:
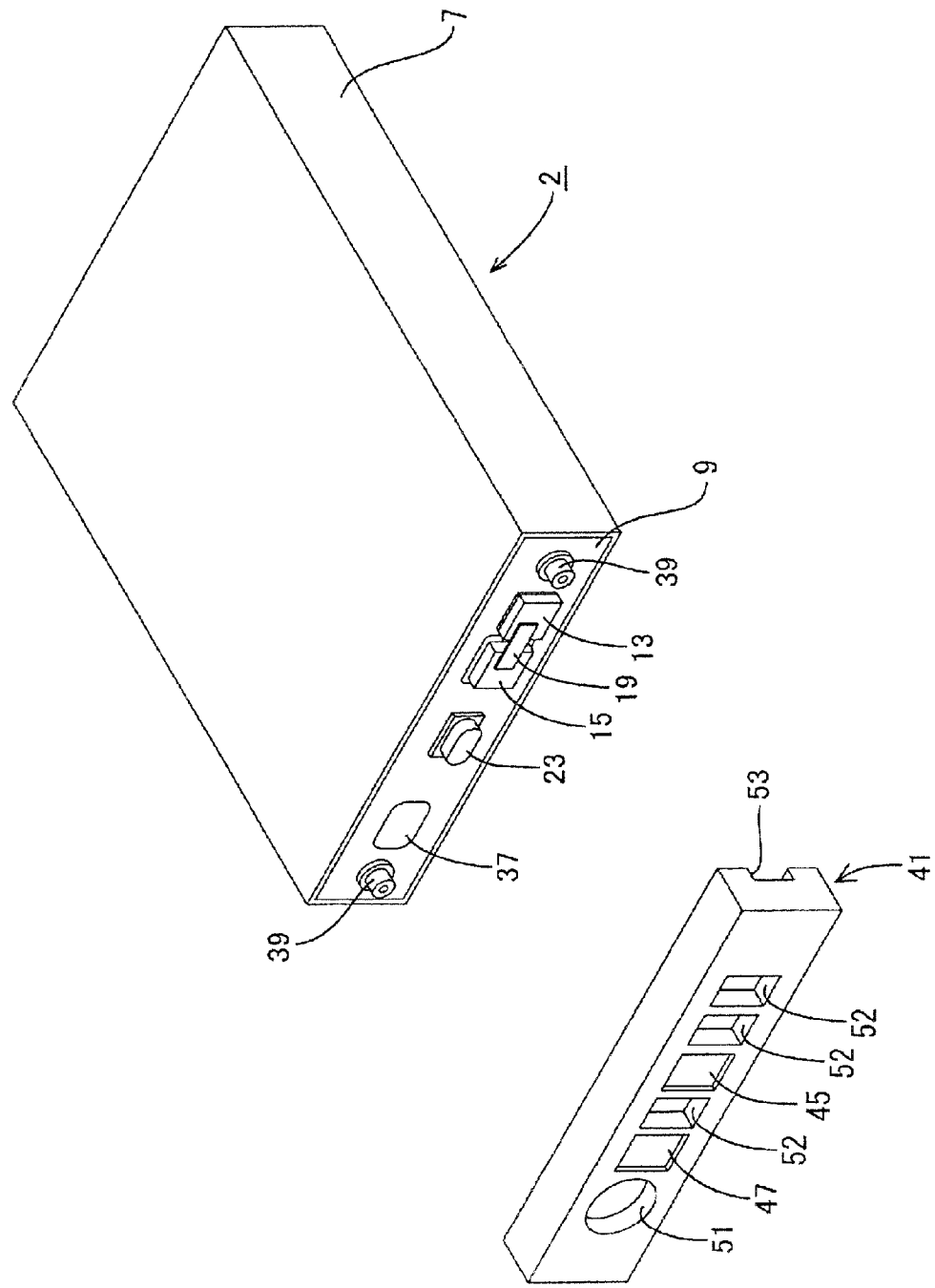
FIG. 1 is an exploded perspective view of a battery pack of a first embodiment in accordance with the present invention.
Figure 2:
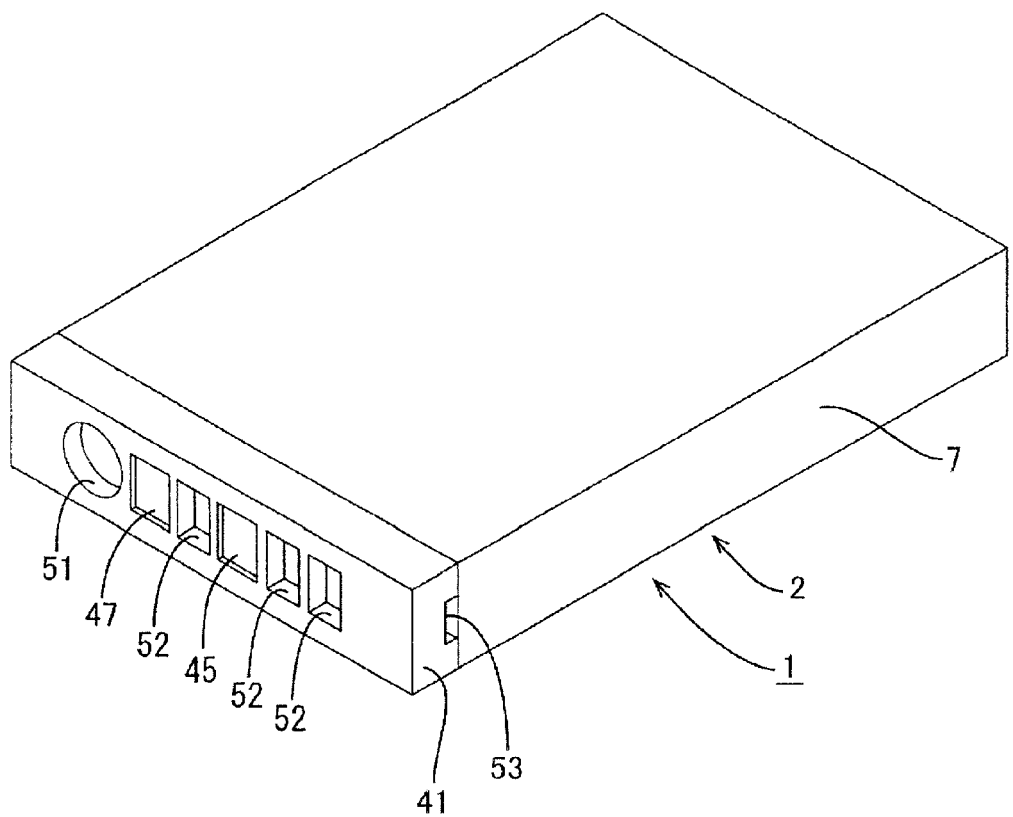
FIG. 2 is a perspective view of the battery pack.

Several embodiments of the present invention will be described. Identical or similar parts are labeled by the same reference symbols throughout the embodiments.

A first embodiment will be described with reference to FIGS. 1 to 4. A battery pack 1 of the first embodiment comprises a battery case 7 and a generally rectangular box-shaped cover 41. A power generating element 4 constituting a secondary battery 2 is enclosed in the battery case 7. One of sides of the battery case 7 is covered with the cover 41 so that a component disposing space 10 is defined between the battery case 7 and the cover 41.

The secondary battery 2 will now be described in detail. The power generating element 4 of the secondary battery 2 includes generally band-shaped negative and positive electrodes both wound with a separator being interposed therebetween so that the power generating element 4 is formed into the shape of a flat scroll with a separator being interposed therebetween, although none of them are shown. The wound power generating element 4 has one side from which a pair of positive and negative leads 3 and 5 extend and which are spaced from each other as viewed in FIG. 3.

The power generating element 4 is put into the rectangular box-shaped battery case 7 from its side opposite the side from which the leads 3 and 5 extend. The battery case 7 is made of an aluminum plate by means of drawing. The battery case 7 has an open side which is closed by a lid 9 secured to the battery case by laser welding. A positive connecting strip 11 made of aluminum, for example, is welded to a left-hand portion of an inside face of the lid 9 as viewed in FIG. 3. The positive connecting strip 11 is electrically connected to the positive lead 3 of the power generating element 4. A positive terminal 13 is provided on an outside face of the lid 9 so as to positionally correspond to the positive connecting strip 11. More specifically, the positive terminal 13 comprises a clad metal made by cladding aluminum on a nickel base and is welded to the outside face of the lid 9 so that an aluminum part is in contact with the lid 9. Thus, the positive terminal 13 is electrically connected via the positive lead 3 and the positive connecting strip 11 to the power generating element 4.

Figure 3:
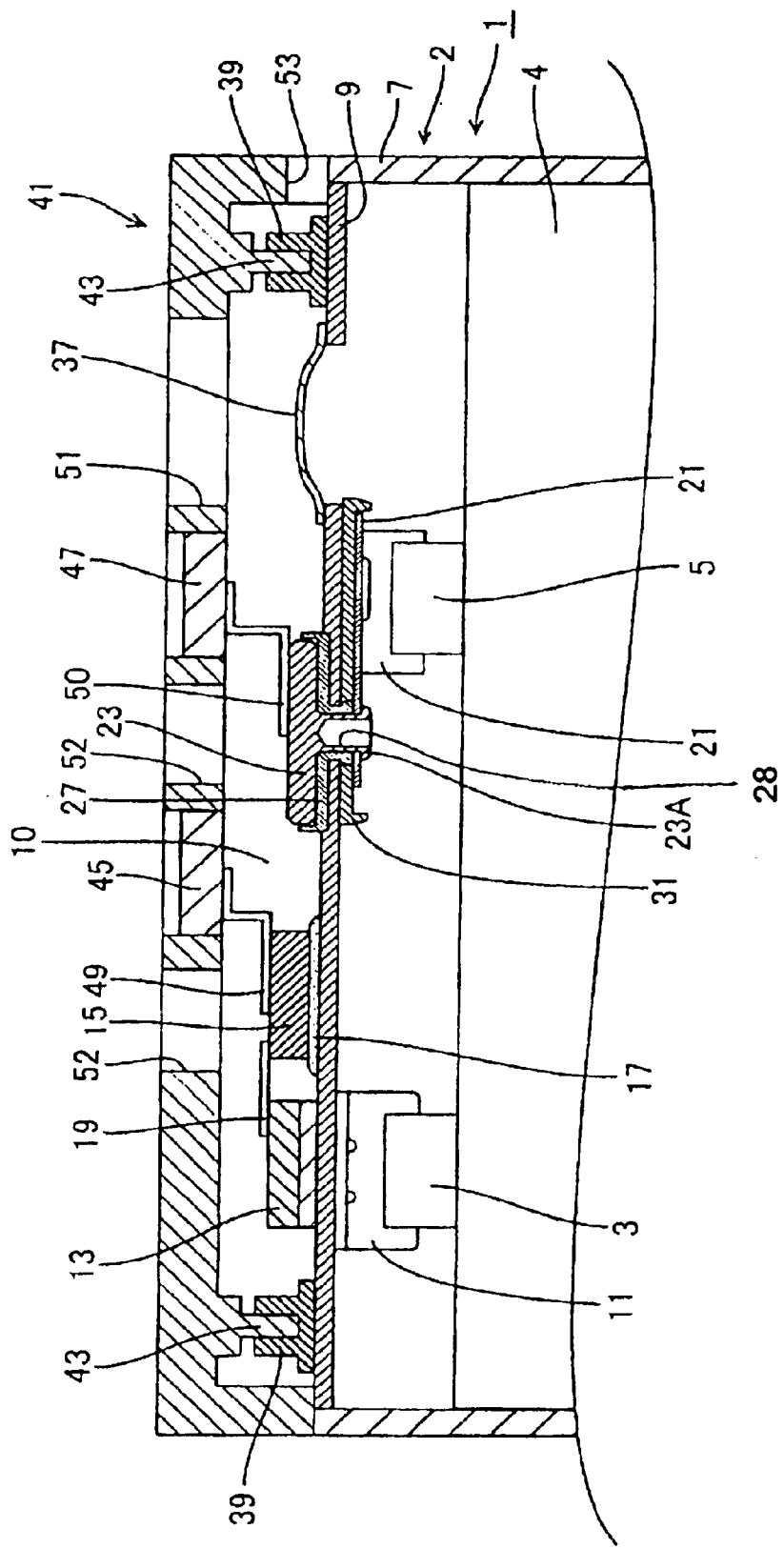
FIG. 3 is a sectional view of the battery pack.
Figure 4:
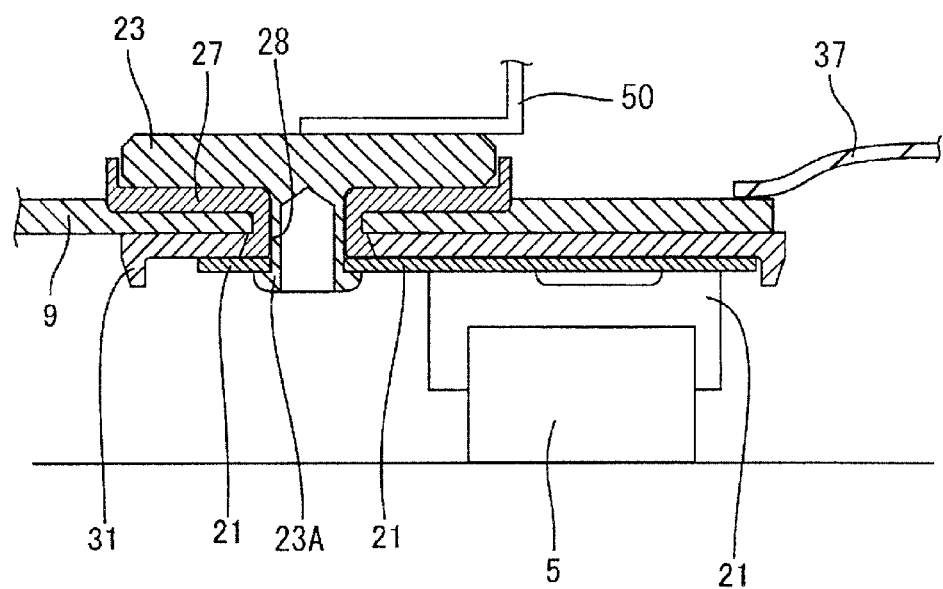
FIG. 4 is a sectional view of a negative terminal employed in the battery pack.

For example, a positive temperature coefficient (PTC) element 15 is bonded by a resin 17 having a good thermal conductivity to the outside face of the lid 9 on the right of the positive terminal 13 as viewed in FIG. 3. The PTC element 15 is connected via a nickel strip 19 to the positive terminal 13. Thus, the PTC element 15 is electrically connected via the positive terminal 13 to the power generating element 4.

A negative terminal 23 is provided on the outside face of the lid 9 on the right of the PTC element 15 so as to be electrically insulated from the lid 9. More specifically, the lid 9 has a through hole 28, and a plastic bush 27 is fitted with the hole 28. The negative terminal 23 is fixed in the bush 27. The negative terminal 23 has a backside on which a shaft 23A is secured. The shaft 23A is inserted through a hole of the bush 27. An insulating plate 31 and the negative connecting strip 21 are fitted with the shaft 23A at the backside of the lid 9. The shaft 23A is then crimped such that the negative terminal 23 is fixed to the lid 9. Thus, the negative terminal 23 is electrically connected to the power generating element 4. Furthermore, a relief valve 37 is provided on the lid 9 on the right of the negative terminal 23 as viewed in FIG. 3. The relief valve 37 comprises a thin film of aluminum covering a generally elliptic through hole formed in the lid 9.

The cover 41 will now be described. The cover 41 is formed into the shape of a bottomed prism having a substantially hollow interior and has an open side. The cover 41 is mounted to the secondary battery 2 with the open side thereof being directed to the secondary battery 2 so that a component disposing space 10 is defined between the cover 41 and the battery case 7. The aforesaid PTC element 15, positive terminal 13 and negative terminal 23 are disposed in the component disposing space 10. The open side of the cover 41 has substantially the same configuration as an upper side face of the secondary battery 2 so as to cover the upper side face of the secondary battery 2.

A positive and a negative charge and discharge terminals 45 and 47 are provided on the cover 41 by the insert molding. Each terminal comprises a nickel base gold-plated for connection to an external circuit. The terminals 45 and 47 provided on the cover 41 are spaced slightly obliquely rightward from the PTC element 15 and the negative terminal 23 respectively as viewed in FIG. 3. The positive charge and discharge terminal 45 is connected via a nickel lead 49 to the PTC element 15 inside the cover 41, whereas the negative charge and discharge terminal 47 is connected via a nickel lead 50 to the negative terminal 23 inside the cover 41. Thus, the positive and negative terminals 13 and 23 are adapted to be connected via the cover 41 to an external circuit.

The cover 41 has two welding through holes 52 formed so as to be located substantially right over the PTC element 15 and the negative terminal 23 both provided on the lid 9, respectively. A pin (not shown) used for welding the nickel leads 49 and 50 is adapted to be inserted through the welding holes 52. The cover 41 further has a vent hole 51 formed therethrough so as to be located substantially right over the relief valve 37 and another vent hole 53 formed through a right-hand side wall thereof so as to be located on the right of the relief valve 37.

An assembling structure of each of the battery case 7 and cover 41 will now be described. The lid 9 of the battery case 7 has two generally cylindrical locking receivers 39 provided on the outside face of the lid 9 so as to be located near opposite ends thereof respectively. Each locking receiver 39 is made of aluminum and has a bottom. The bottom of each locking receiver 39 is welded to the outside face of the lid 9 so that each locking receiver 39 is fixed to the lid 9 with an open end thereof being directed to the bottom of the cover 41.

The cover 41 has two locking protrusions 43 formed thereon so as to correspond to the locking receivers 39 respectively. Each locking protrusion 43 is formed into a cylindrical shape and has substantially the same section as the open end of the locking receiver 39. The locking protrusions 43 are force fitted into the open ends of the locking receivers 39 such that the locking protrusions 43 are engaged with the locking receivers 39, respectively, whereby the cover 41 is fixed to the battery case 7.

The following describes electrical connection of the positive and negative charge and discharge terminals 45 and 47.

Before the cover 41 is mounted to the secondary battery 2, the nickel leads 49 and 50 are welded to the backsides of the positive and negative charge and discharge terminals 45 and 47 respectively. The cover 41 is then mounted to the secondary battery 2 so that distal ends of the nickel leads 49 and 50 are connected to or are brought into contact with upper faces of the PTC element 15 and negative terminal 23 respectively. Thereafter, a distal end pin of a probe of a resistance spot welder (not shown) is inserted through the welding through holes 52 of the cover 41 so that the nickel leads 49 and 50 are welded to the PTC element 15 and negative terminal 23 respectively.

According to the above-described embodiment, the positive and negative terminals 13 and 23 both to be connected to an external circuit are disposed in the component disposing space 10 defined between the battery case 7 and the cover 41. Accordingly, no nickel lead connected to one of the terminals is required to extend along the battery case to the other side where the other terminal is located, whereupon the sides of the secondary battery need not be covered with a plastic case. Furthermore, the PTC element 15 necessary for connection to an external circuit is also disposed in the component disposing space 10, so that all the necessary electrical elements are located inside the cover 41. Consequently, no plastic case covering the overall secondary battery 2 is required. Furthermore, in assembling the battery pack 1, the locking protrusions 43 formed on the cover 41 are engaged with the locking receivers 39 of the battery case 7 respectively. Consequently, the cover 41 can easily be assembled to the battery case 7. Additionally, since there is no possibility that the secondary battery 2 may be heated during the assembly, the secondary battery can be prevented from deterioration.

Figure 5:
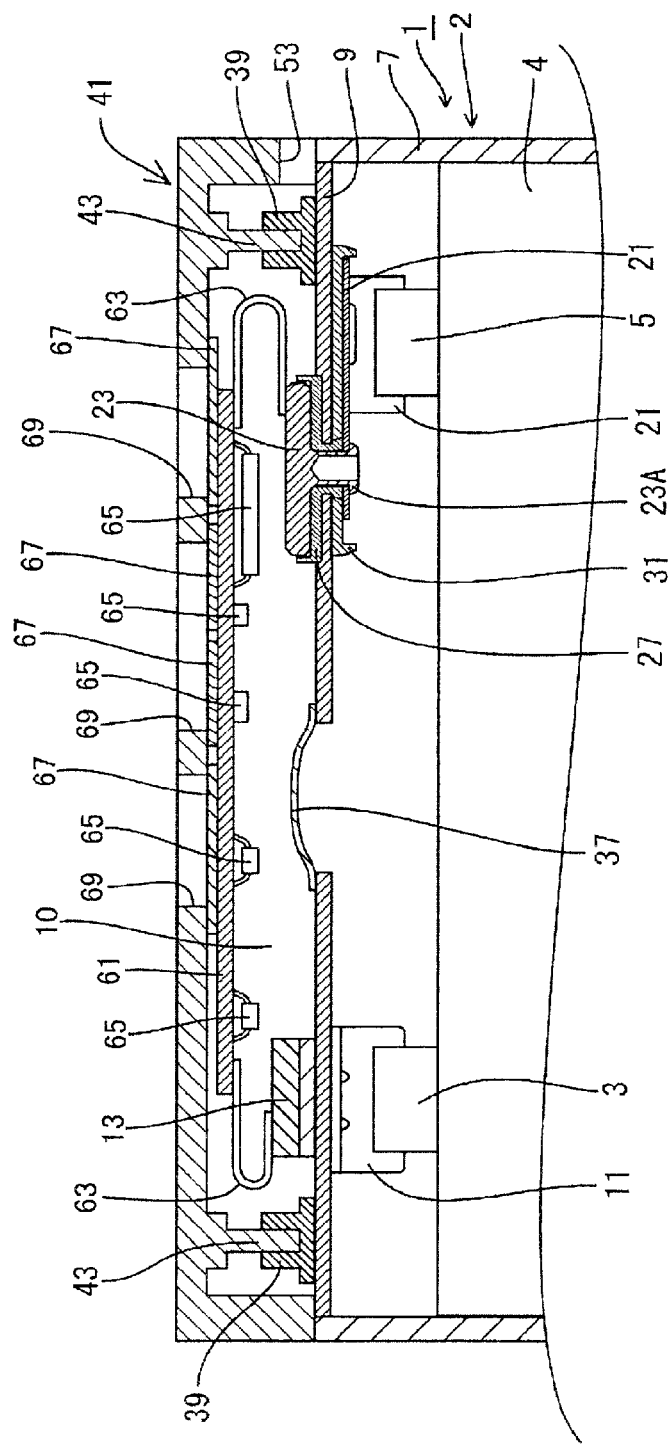
FIG. 5 is a sectional view of the battery pack of a second embodiment in accordance with the invention.
Figure 6:
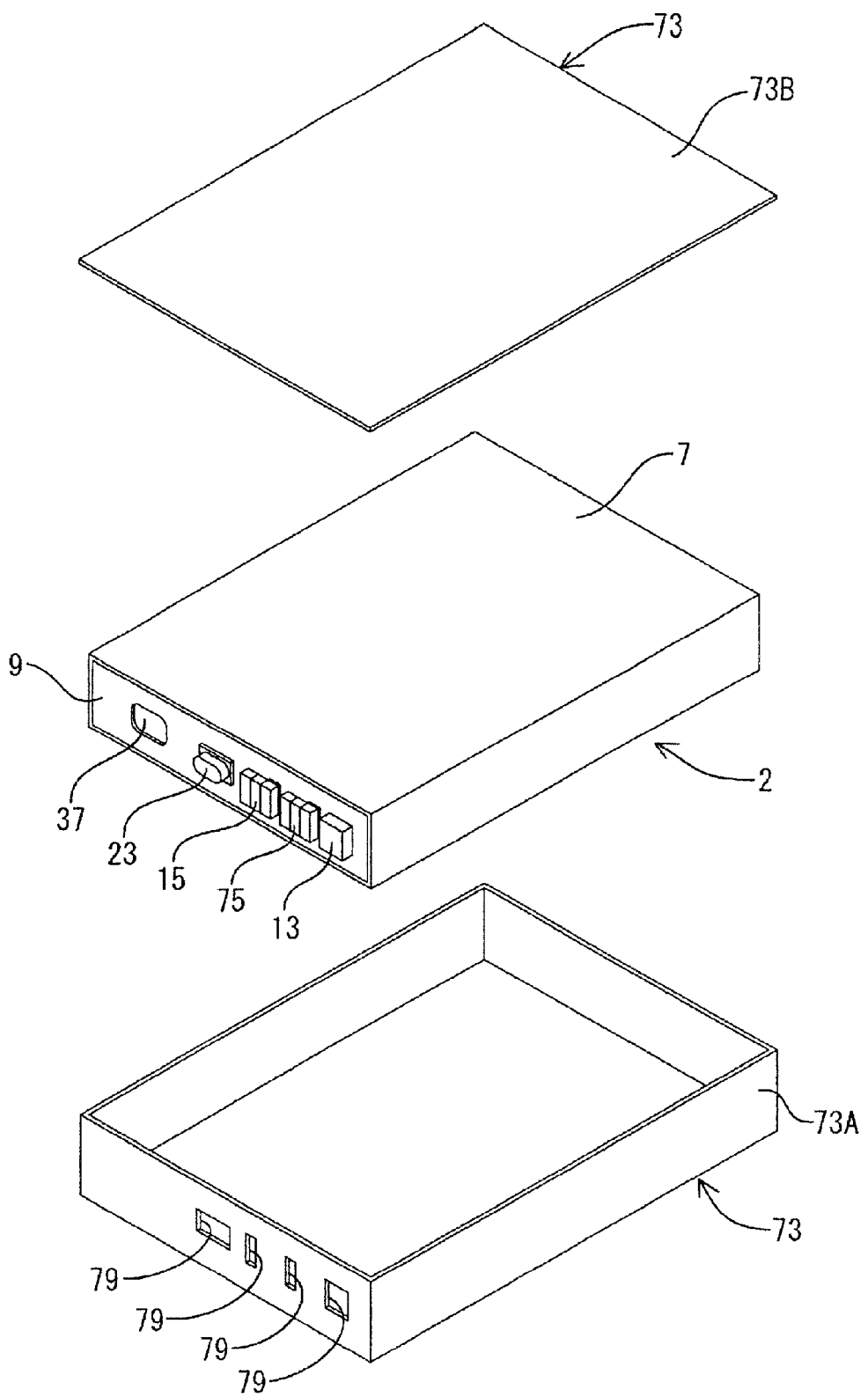
FIG. 6 is an exploded perspective view of the battery pack of a third embodiment in accordance with the invention.
Figure 7:
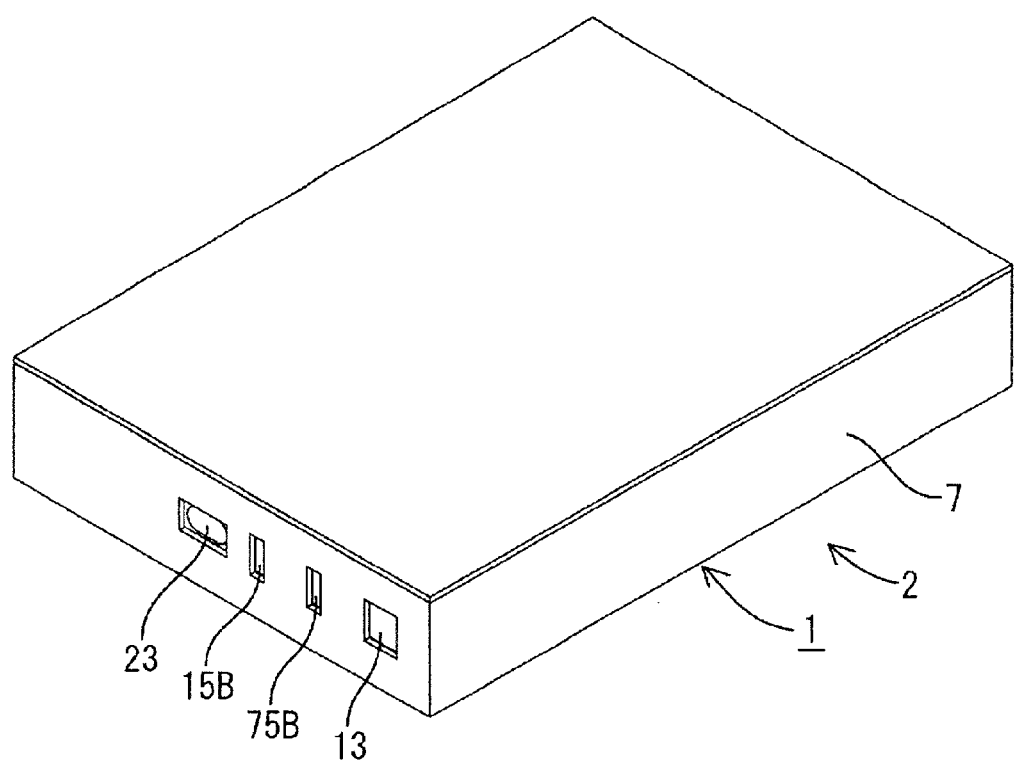
FIG. 7 is a perspective view of the battery pack of the third embodiment.

FIG. 5 illustrates a second embodiment of the invention. Only the differences of the second embodiment from the first embodiment will be described.

The secondary battery 2 is enclosed in the battery case 7 in the same manner as in the first embodiment. The positive terminal 13 is provided on a right-hand part of the outside face of the lid 9, whereas the negative terminal 23 is provided on a left-hand part of the outside face of the lid 9, as viewed in FIG. 5. A circuit board 61 is connected to the positive and negative terminals 13 and 23. The circuit board 61 is formed into the shape of a strip which is as wide as and shorter than the lid 9. A left-hand end of the circuit board 61 is electrically connected via a nickel lead 63 to the positive terminal 13, whereas a right-hand end of the circuit board 61 is electrically connected via another nickel lead 63 to the negative terminal 23, as viewed in FIG. 5, whereby the circuit board 61 is spaced from and parallel to the outside face of the lid 9. A circuit element 65 is disposed on a side of the circuit board 61 opposite to the lid 9. Terminals 67 are provided on the backside of the circuit board 61. The rectangular box-shaped cover 41 made of a resin is mounted to the secondary battery 2 with the open end thereof being directed downward, so as to cover the lid 9. The cover 41 has through holes 69 positionally corresponding to the terminals 67 respectively. The terminals 67 are exposed through the respective through holes 69 under a condition where the cover 41 is attached to the secondary battery 2. The same effect can be achieved from the above-described battery pack 1 of the second embodiment as from that of the first embodiment.

FIGS. 6 to 10 illustrate a third embodiment of the invention. Only the differences of the third embodiment from the first embodiment will be described.

The battery pack 1 of the third embodiment comprises a battery case 7, a thermistor 75, and a PTC element 15. A power generating element 4 constituting a secondary battery 2 is enclosed in the battery case 7. The thermistor 75 has a plurality of terminals 75A and 75B and is mounted to one side of the battery case 7. The PTC element 15 also has a plurality of terminals 15A and 15B and is mounted to the side of the battery case 7.

The secondary battery 2 will now be described in detail. The power generating element 4 of the secondary battery 2 includes generally band-shaped negative and positive electrodes both wound with a separator being interposed therebetween so that the power generating element 4 is formed into the shape of a flat scroll with a separator being interposed therebetween, although none of them are shown. The wound power generating element 4 has one side from which a pair of positive and negative leads 3 and 5 extend. and which are spaced from each other as viewed in FIG. 3.

The power generating element 4 is put into the rectangular box-shaped battery case 7 from its side opposite the side from which the leads 3 and 5 extend. The battery case 7 is made of an aluminum plate by means of drawing. The battery case 7 has an open side which is closed by a lid 9 secured to the battery case by laser welding. A positive connecting strip 11 made of aluminum, for example, is welded to a left-hand portion of an inside face of the lid 9 as viewed in FIG. 9. The positive connecting strip 11 is electrically connected to the positive lead 3 of the power generating element 4. A positive terminal 13 is provided on an outside face of the lid 9 so as to positionally correspond to the positive connecting strip 11. More specifically, the positive terminal 13 comprises a clad metal made by cladding aluminum on a nickel base and is welded to the outside face of the lid 9 so that an aluminum part is in contact with the lid 9. Thus, the positive terminal 13 is electrically connected via the positive lead 3 and the positive connecting strip 11 to the power generating element 4.

Figure 8:
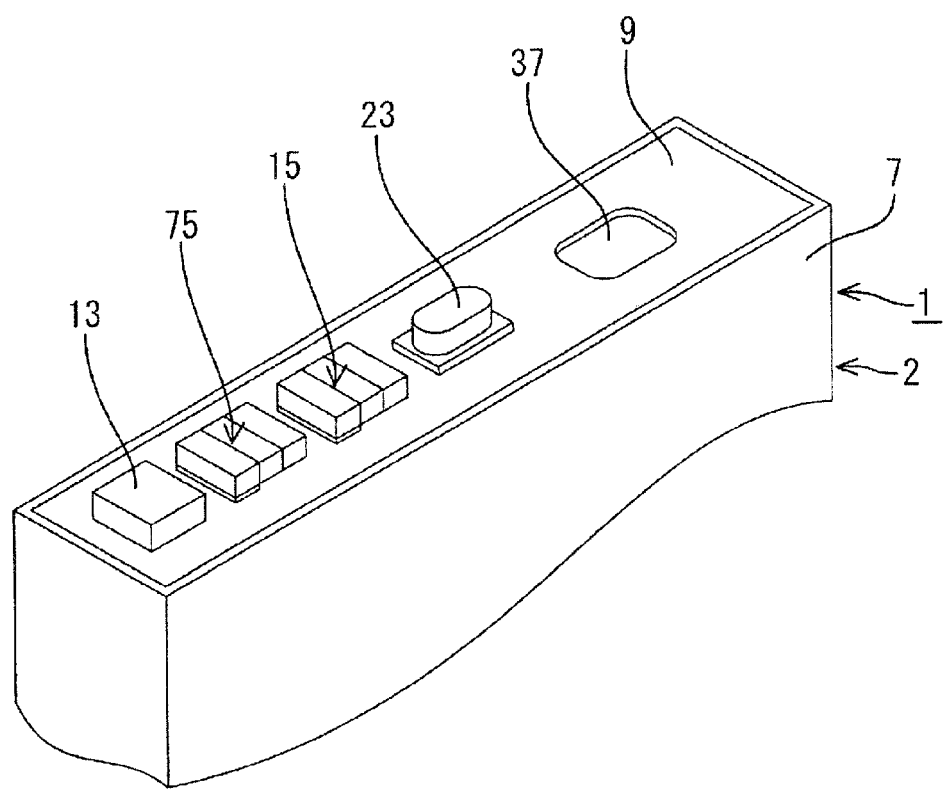
FIG. 8 is a partial perspective view of the battery pack of the third embodiment.
Figure 9:
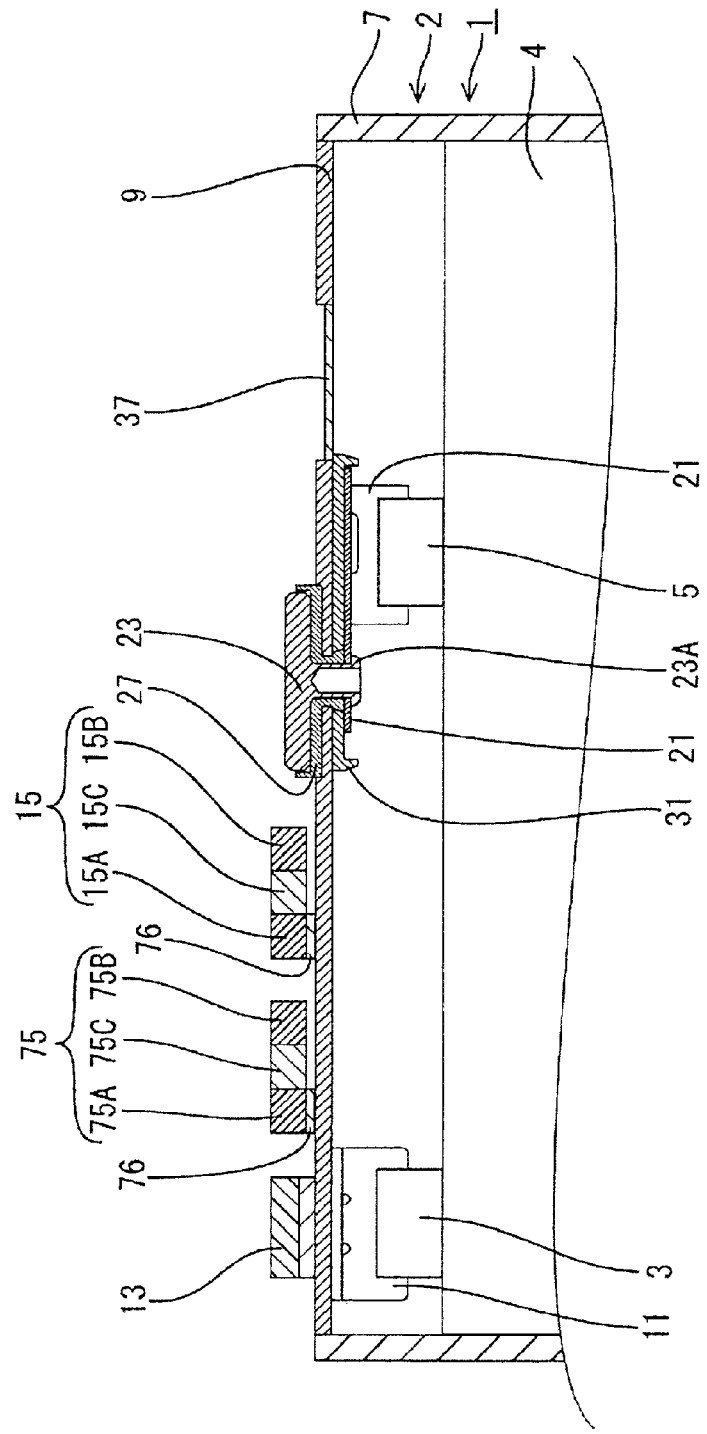
FIG. 9 is a sectional view of the battery pack of the third embodiment.
Figure 10:
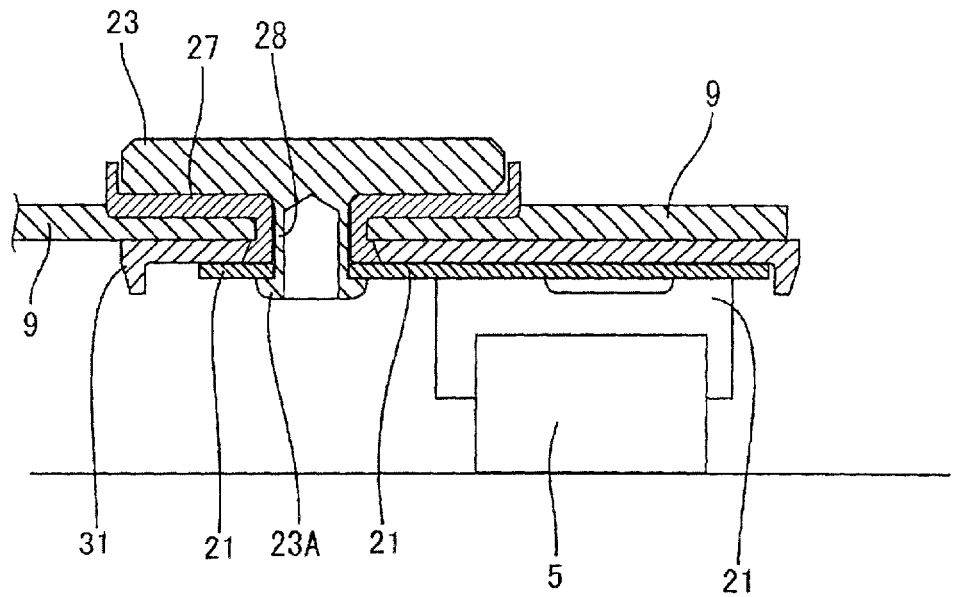
FIG. 10 is a sectional view of a negative terminal employed in the battery pack of the third embodiment.

The thermistor 75 and the PTC element 15 both serving as circuit elements are provided on the outside face of the lid 9 so as to be located on the right of the positive terminal 13 as viewed in FIG. 8. The thermistor 75 has substantially the same height as the positive terminal 13 and is formed into the shape of a box. The thermistor 75 has a laminated structure in which a functional portion 75C is interposed between the paired terminals 75A and 75B. The terminal 75A is connected to a connecting member 76 further connected to the lid 9, whereby the thermistor 75 is mounted to the lid 9 so that a direction of lamination is parallel to the side of the lid 9 on which the thermistor is mounted or the lid 9. The connecting member 76 includes a clad metal made by joining or cladding aluminum to or on a nickel base. An aluminum side of the clad metal is laser-welded to the outside face of the lid 9. The nickel base of the clad metal is soldered to the terminal 75A. Thus, the terminal 75A is electrically connected to the power generating element 4. The other terminal 75B is used for connection to an external circuit.

The PTC element 15 also has substantially the same height as the positive terminal 13 and is also formed into the shape of a box. Furthermore, the PTC element 15 also has a laminated structure in which a functional portion 15C is interposed between the paired terminals 15A and 15B. The terminal 15A is connected to a connecting member 76 further connected to the lid 9, whereby the PTC element 15 is mounted to the lid 9 so that a direction of lamination is parallel to the side of the lid 9 on which the thermistor is mounted or the lid 9. The connecting member 76 has the same construction as that used for the thermistor 75 and is secured to the lid 9 in the same manner as described above regarding the thermistor 75. Accordingly, the terminal 15A is electrically connected to the power generating element 4. The other terminal 15B is used for connection to an external circuit.

A negative terminal 23 is provided on the outside face of the lid 9 on the right of the PTC element 15 so as to be electrically insulated from the lid 9. The negative terminal 23 has substantially the same height as the positive terminal 13 and is formed into the shape of a box. The lid 9 has a through hole 28, and a plastic bush 27 is fitted with the hole 28. The negative terminal 23 is fixed in the bush 27. The negative terminal 23 has a backside on which a shaft 23A is secured. The shaft 23A is inserted through a hole of the bush 27. An insulating plate 31 and the negative connecting strip 21 are fitted with the shaft 23A at the backside of the lid 9. The shaft 23A is then crimped such that the negative terminal 23 is fixed to the lid 9. Thus, the negative terminal 23 is electrically connected to the power generating element 4. Furthermore, a relief valve 37 is provided on the lid 9 on the right of the negative terminal 23 as viewed in FIG. 9. The relief valve 37 comprises a thin film of aluminum covering a generally elliptic through hole formed in the lid 9.

The secondary battery 2 is enclosed in a case 73 made of a resin. The case 73 comprises a casing 73A having an open side and a lid 73B covering the open side and is formed into the shape of a box. The casing 73A has four through holes 79 formed so as to correspond to the negative terminal 13 mounted on the lid 9 of the secondary battery 2, the terminal 75B for connection of the thermistor 75 to an external circuit, the terminal 15B for connection of the PTC element 15 to the external circuit, and the negative terminal 23 respectively.

According to the above-described construction, the size and cost of the battery pack 1 can be reduced since no protection circuit board is used. Furthermore, increase in the temperature of the secondary battery 2 can easily be detected since the thermistor 75 and the PTC element 15 are adjacent to the lid 9. Additionally, since the thermistor 75, the PTC element 15 and the positive and negative terminals 13 and 23 have substantially the same height, the configuration of the resin case 73 can be simplified.

Figure 11:
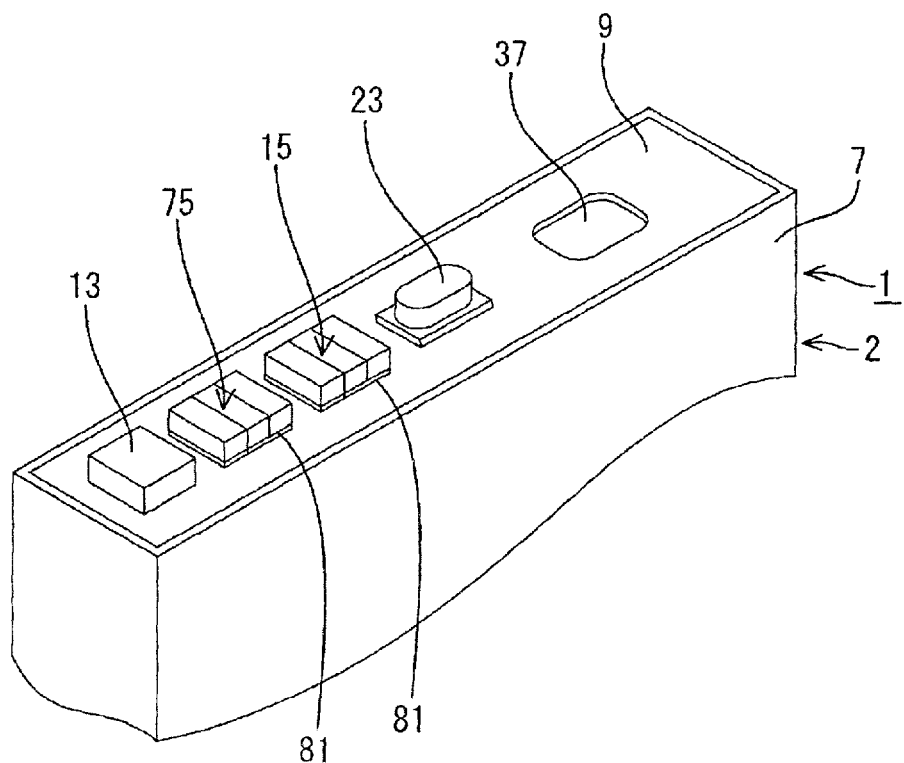
FIG. 11 is a partial perspective view of the battery pack of a fourth embodiment in accordance with the invention.
Figure 12:
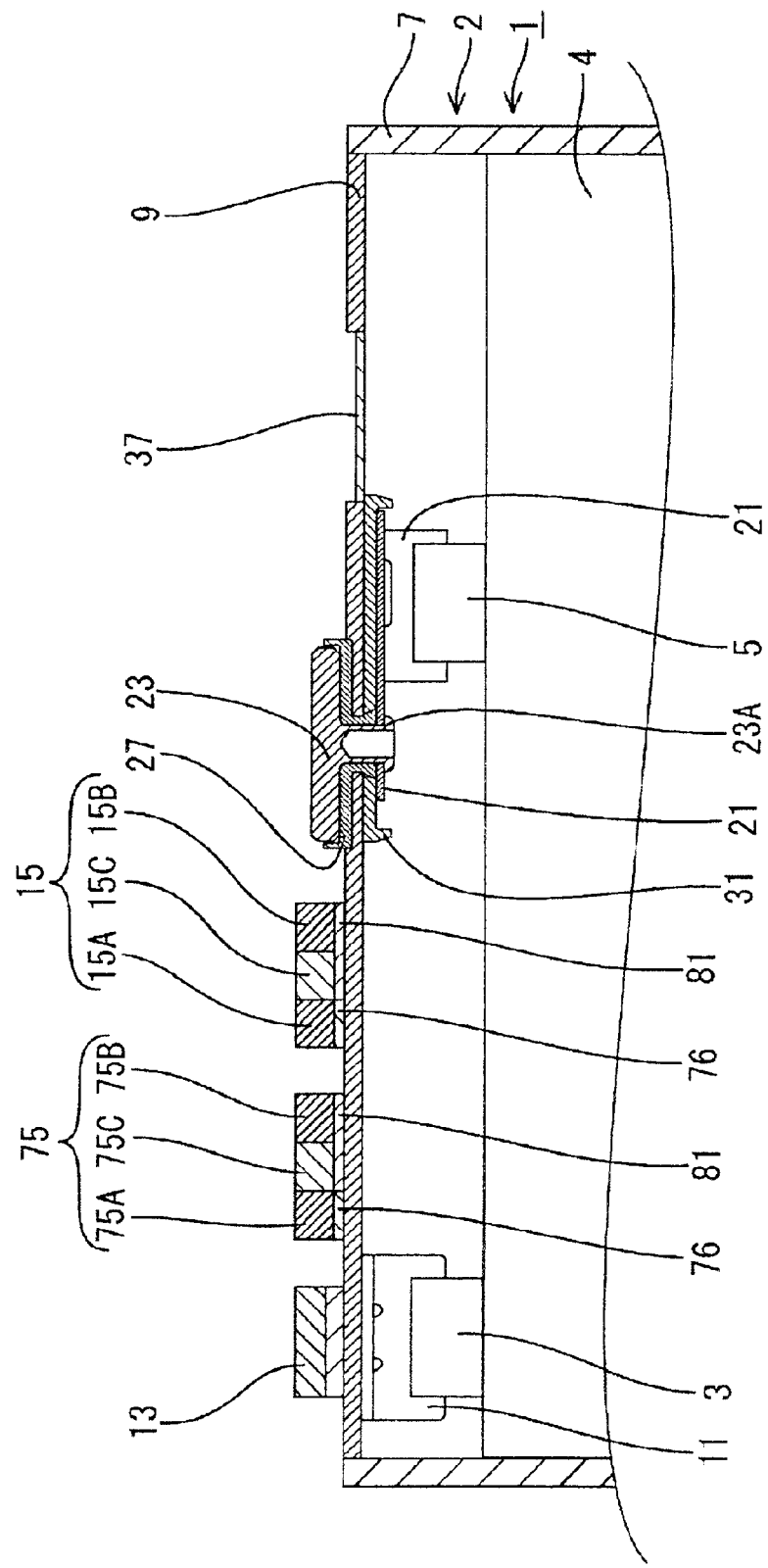
FIG. 12 is a sectional view of the battery pack of the fourth embodiment.

FIGS. 11 and 12 illustrate a fourth embodiment of the invention. Only the differences of the fourth embodiment from the third embodiment will be described. An insulating resin layer 81 is provided between the lid 9, and the terminal 75B adapted to be connected to the external circuit and the functional portion 75C. Another insulating resin layer 81 is also provided between the lid 9, and the terminal 15B adapted to be connected to the external circuit and the functional portion 15C. Consequently, insulation between the lid 9 and the terminals 75B and 15B can be rendered reliable. Furthermore, increase in the temperature of the secondary battery 2 can easily be detected since the thermistor 75 and the PTC element 15 are adjacent via the respective insulating resin layers 81 to the lid 9.

Figure 13:
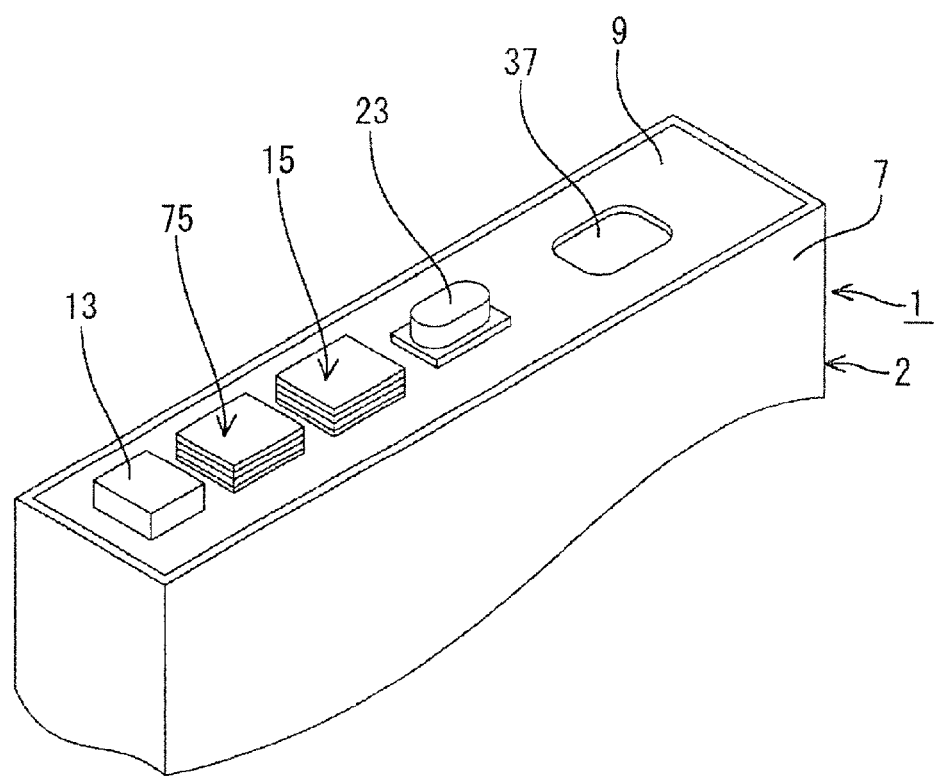
FIG. 13 is a partial perspective view of the battery pack of a fifth embodiment in accordance with the invention.
Figure 14:
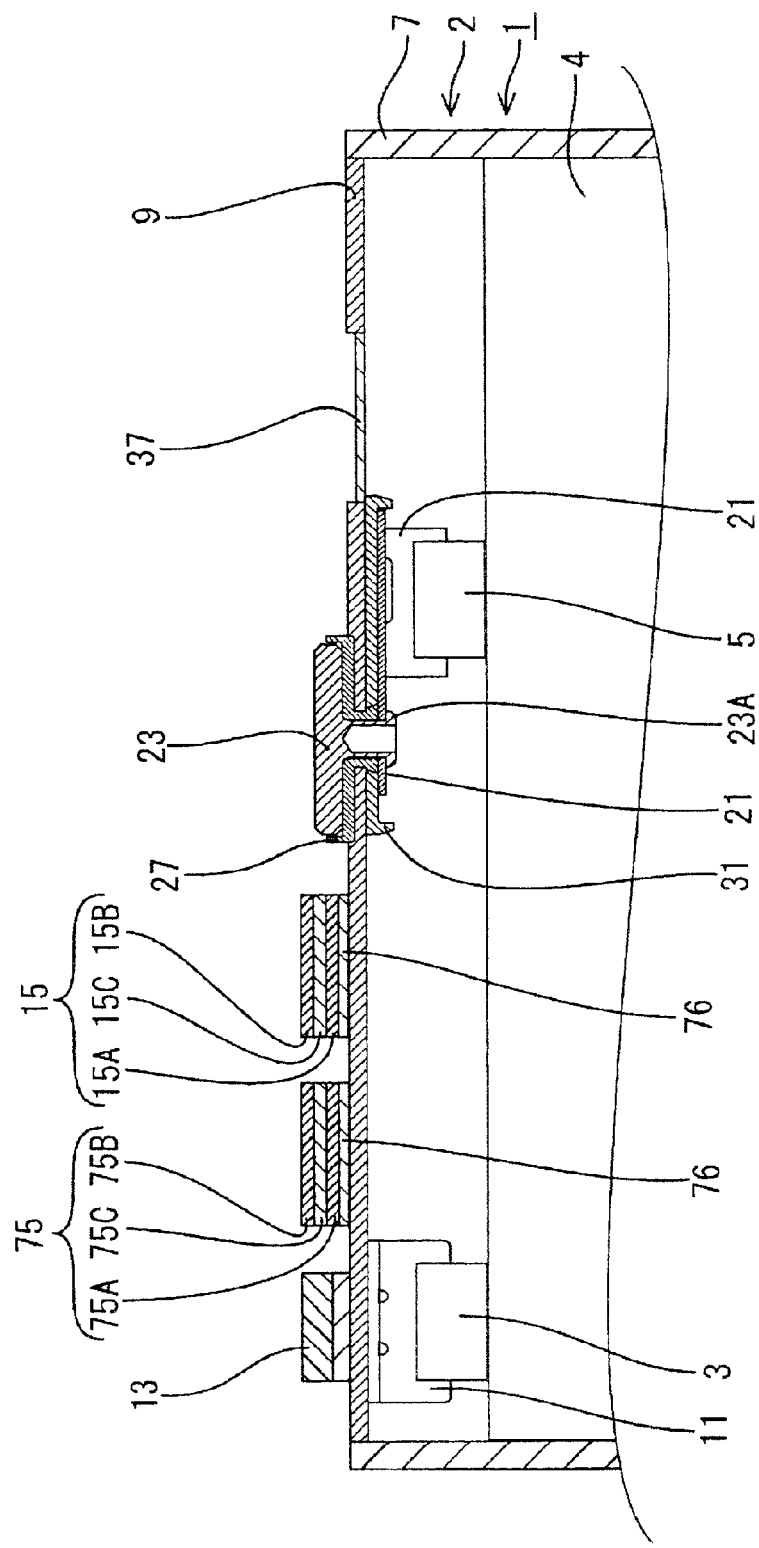
FIG. 14 is a sectional view of the battery pack of the fifth embodiment.

FIGS. 13 and 14 illustrate a fifth embodiment of the invention. Only the differences of the fifth embodiment from the third embodiment will be described. The thermistor 75 is formed into the shape of a box and has a laminated structure in which a flat functional portion 75C is interposed between the paired flat terminals 75A and 75B. The thermistor 75 is mounted to the lid 9 so that a direction of lamination is generally perpendicular to the side of the lid 9 on which the thermistor is mounted or the lid 9.

The PTC element 15 is also formed into the shape of a box. Furthermore, the PTC element 15 also has a laminated structure in which a flat functional portion 15C is interposed between the paired flat terminals 15A and 15B. The PTC element 15 is mounted to the lid 9 so that a direction of lamination is generally perpendicular to the side of the lid 9 on which the thermistor is mounted or the lid 9.

Since the terminals 75B and 15B are not opposite to the lid 9 in the above-described construction, the terminals are prevented from contact with the lid. Consequently, the terminals 75B and 15B can reliably be insulated from the lid 9.

Figure 15:
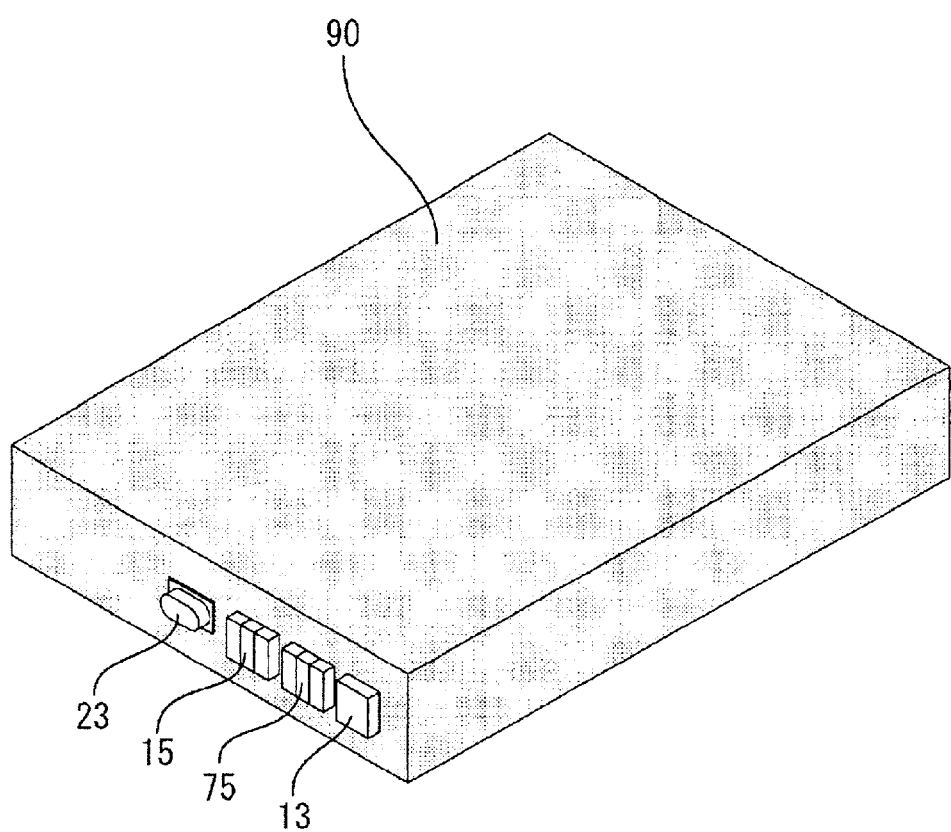
FIG. 15 is a perspective view of the battery pack of a sixth embodiment in accordance with the invention.
Figure 16:
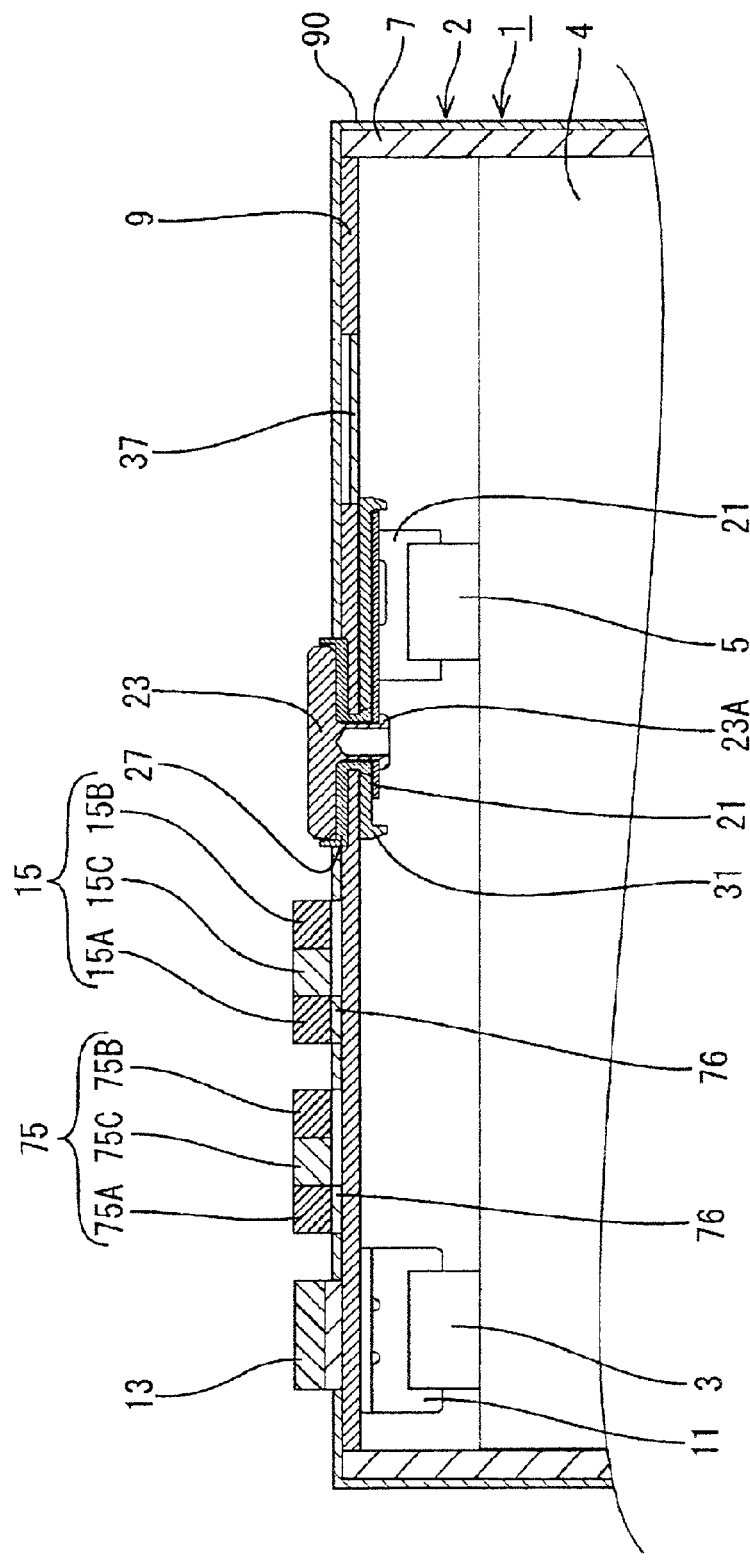
FIG. 16 is a sectional view of the battery pack of the sixth embodiment.

FIGS. 15 and 16 illustrate a sixth embodiment of the invention. Only the differences of the sixth embodiment from the third embodiment will be described. In the sixth embodiment, the battery case 7 is covered with an insulating layer 90 although the thermistor 75, the PTC element 15, the positive and negative terminals 13 and 23 are exposed. Accordingly, the sides of the battery pack 1 can reliably be insulated without increases in the size and weight thereof. The insulating layer 90 generally comprises an insulating resin film or insulating layer by an anodic oxide coating process.

In each of the foregoing embodiments, the PTC element 15 and/or the thermistor 75 serve as the circuit elements. However, the circuit element may comprise a thermal fuse, thermal protector, identifying resistor, NTC thermistor, etc. other than the thermistor and PTC element. A plurality of circuit elements may be employed.

The battery pack 1 includes the flat box-shaped secondary battery 2 in each embodiment. However, the secondary battery should not be limited to the above-mentioned shape. For example, the secondary battery may be a cylindrical battery or a battery of the type that a battery case is formed of a resin film made by laminating metal films. Furthermore, the lithium ion battery is most suitable as the secondary battery used in the present invention. In this case, for example, the power generating element may comprise a positive electrode plate on which an active material such as lithium cobalt oxide is applied, a separator retaining an organic electrolyte containing lithium salt and a negative electrode plate on which a host substance such as carbon material is applied. The positive electrode plate, separator and negative electrode plate are stacked in this order and then scrolled. Electrodes may be made of a polymer material such as polyacetylene. A polymer solid electrolyte may be used instead of the organic electrolyte.

In each of the first and second embodiments, the battery case 7 is provided with the locking receivers 39 and the cover 41 is provided with the locking protrusions 43. However, the locking protrusions 43 may be provided on the battery case 7 and the locking receivers 39 may be provided on the cover 41, instead.

In each of the first and second embodiments, the cover 41 is fixed to the battery case 7 by the engagement of the locking protrusions 43 and the respective locking receivers 39. However, the cover 41 and the battery case 7 may be integrated by any other means. For example, the cover 41 and the battery case 7 may be fixed together by means of bolt and nut, caulking, engagement claws, bonding, etc.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

I claim:

1. A battery pack adapted to be connected to an external circuit, comprising:

a battery case in which a power generating element is enclosed, the battery case having at least one side;

a cover covering the side of the battery case so that a component disposing space is defined between the battery case and the cover;

a circuit element disposed in the component disposing space and connected to the power generating element; and a terminal disposed in the component disposing space and connected both to the power generating element and via the cover to the external circuit, wherein either one of the battery case and the cover has a locking protrusion located in the component disposing space, and the other has a locking receiver with which the locking protrusion is engaged so that the battery case and the cover are assembled together.

2. A battery pack according to claim 1, further comprising a circuit board provided inside the cover, the circuit element being mounted on the circuit board.

* * * * *